United States Patent [19]
Brister et al.

[11] Patent Number: 5,328,011
[45] Date of Patent: Jul. 12, 1994

[54] CLUTCH ASSEMBLY FOR CHAIN-DRIVEN CART

[76] Inventors: Charles Brister, Rt. 3, Box 18-P Ellis Rd., Amite, La. 70422; J. H. Brister, P.O. Box 275, Roseland, La. 70456

[21] Appl. No.: 33,872

[22] Filed: Mar. 19, 1993

[51] Int. Cl.⁵ .................. F16D 13/64; F16D 13/72
[52] U.S. Cl. .................. 192/113.36; 192/113.5; 184/105.3
[58] Field of Search ......... 192/113 P, 113 R, 113 LC, 192/113 BG; 184/105.3, 6.8, 7.1, 6.17

[56] References Cited

U.S. PATENT DOCUMENTS

| | | | |
|---|---|---|---|
| 1,556,706 | 10/1925 | Moorhouse | 192/113 P |
| 1,902,050 | 3/1933 | Vincent | 192/113 P |
| 2,057,802 | 10/1936 | Tatter | 192/113 P X |
| 2,097,856 | 11/1937 | Fawick | 192/113 P X |
| 2,845,160 | 7/1958 | Bahan | 192/113 P X |
| 2,903,113 | 9/1959 | Lutke | 192/113 P |
| 3,207,280 | 9/1965 | Dangauthier | 192/113 P X |
| 3,292,753 | 12/1966 | Svaty et al. | 192/113 P X |
| 4,293,056 | 10/1981 | Setree, II | 184/105.3 X |
| 5,029,673 | 7/1991 | Arrington | 184/105.3 |

FOREIGN PATENT DOCUMENTS 756647  9/1956  United Kingdom ............ 192/113 R

Primary Examiner—Leslie A. Braun
Assistant Examiner—Andrea Pitts
Attorney, Agent, or Firm—Pravel, Hewitt, Kimball & Krieger

[57] ABSTRACT

A centrifugal, shaft-driven clutch apparatus includes an engine shaft for providing rotary power, the engine shaft having a free end portion and an open ended bore that communicates with the free end portion. A centrifugal clutch assembly includes a clutch bushing member having a shaft bore for affixing the bushing member to the shaft. The bushing member provides an internal bore and an outer surface. The clutch assembly includes a clutch housing member with an internal bore, and the clutch housing rotates upon the clutch bushing member at the internal bore. A first port extends between the shaft bore and the clutch bushing for transmitting lubricant from the shaft bore to the clutch bushing member. A second port extends through the bushing member bore to the outer surface thereof. A channel forms a communication between the first and second ports for transporting lubricant between the first and second ports. A fitting provides an inlet portion for receiving lubricant, and is attached to the shaft bore. The fitting includes an enlarged head portion that retains the clutch assembly upon the shaft during use.

13 Claims, 4 Drawing Sheets

CLUTCH ASSEMBLY FOR CHAIN-DRIVEN CART

BACKGROUND OF THE INVENTION

1. Field of the Invention

The present invention relates to small, chain-driven carts (sometimes referred to as "go-carts"), and the like having an internal combustion engine of, for example, five-ten (5-10) horse power that drives the cart rear wheels via an axle and centrifugal clutch. Even more particularly, the present invention relates to an improved engine shaft, clutch, and chain-driven axle assembly for powering small motorized carts wherein an improved lubrication arrangement allows grease to be injected through an engine drive shaft (or a short intermediate shaft or "jack" shaft) of the cart via a porting system so that the clutch is lubricated when rotating at high speeds, namely, when the cart is at rest and the engine idles.

2. General Background

Small chain-driven motorized carts are commercially available from a number of manufacturers. These carts are used primarily for off road motoring at relatively low speeds. They are frequently used for backyard and off road family fun, and can be found at amusement parks and fairs on occasion.

These small chain-driven carts include a metal frame that is generally of welded steel, using square and round tubing and plate steel, for example. Such small carts use an internal combustion engine for power, usually on the order of five to ten (5-10) horse power, as an example. The cart frame is constructed very low to the ground for stability purposes. The engine on such a cart is usually a commercially available internal combustion engine, having a drive shaft that carries a centrifugal clutch. A sprocket on the clutch engages an endless belt or chain. Another sprocket rigidly affixed to the axle also engages the endless belt or chain. When the engine of the cart idles, the centrifugal clutch by design is disengaged. When the user presses a throttle (e.g., foot pedal) the engine revolutions increase and the clutch engages so that the sprocket of the clutch rotates and drives the endless belt or chain and its associated axle sprocket and attached axle.

By placing the cart low to the ground, equipping the cart with relatively small wheels, and by using the cart in a off road environment, the centrifugal clutch is subjected to dirt, sand, dust, and debris which accumulates in and around the clutch assembly. This produces an abrasive environment which can quickly wear out the clutch parts. The centrifugal clutch is typically rotated at high speeds when the cart idles. The clutch engages upon increasing engine revolutions so that centrifugal members engage the clutch and it forms a rigid connection with the drive shaft of the cart.

Typically, these carts use a horizontal shaft engine. The drive shaft extends horizontally from one side of the engine. However, it should be understood that a short separate intermediate drive shaft sometimes referred to a "jack-shaft" can be used to drive the carts. A "jack-shaft" is simply a short shaft mounted between bearings and in spaced-apart position away from the horizontal shaft of the engine. The "jack-shaft" is driven by the motor shaft using a belt or sprockets and a chain, for example. In either situation, the present invention is designed to provide an improved lubrication arrangement for the engine shaft, and/or a "jack-shaft" used with the engine drive.

SUMMARY OF THE INVENTION

The present invention provides an improved method of cart lubrication of the type described above, and an improved centrifugal, shaft-driven clutch apparatus that includes an engine shaft for providing rotary power, wherein the engine shaft has a free end portion and an internal, open ended bore that communicates with the free end portion. In the preferred embodiment, the open ended bore has a central longitudinal axis that is coincident with the central longitudinal axis of the shaft.

In the preferred embodiment, the engine shaft is a horizontally extending engine shaft that is positioned parallel to the axle of the cart during use.

A centrifugal clutch assembly includes a clutch bushing member having a shaft bore for affixing the busing member to the horizontal engine shaft.

The bushing member includes an inner cylindrical bore and an outer generally cylindrical surface. The clutch assembly includes a clutch housing with an internal bore. The clutch housing member is sized and shaped to rotatably mount upon and rotate upon the clutch bushing member. The internal bore of the clutch housing registers upon the outer generally cylindrical surface of the clutch bushing. During use, the clutch housing member is held in a non-rotating position by an endless belt or chain which attaches to the sprocket teeth of the clutch housing member and also to an axle sprocket is regidly mounted to the rear axle of the cart. When the engine revolutions are increased, the clutch housing member contains a centrifugal actuating member that engages so that the clutch housing member and bushing member rotate as a unit to drive the cart.

A first port extends through the shaft bore and the clutch bushing for transmitting lubricant from the shaft bore to the clutch bushing member. A second port extends from the bushing inner bore to the outer cylindrical surface.

A channel is provided for forming a communication between the first and second ports, for transporting a lubricant (such as grease) between the first and second ports.

An inlet fitting registers upon the shaft bore and provides an inlet for receiving lubricant such as from a grease gun. The fitting has a channel for transmitting lubricant to the shaft bore when dispensed to the fitting by the grease gun.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
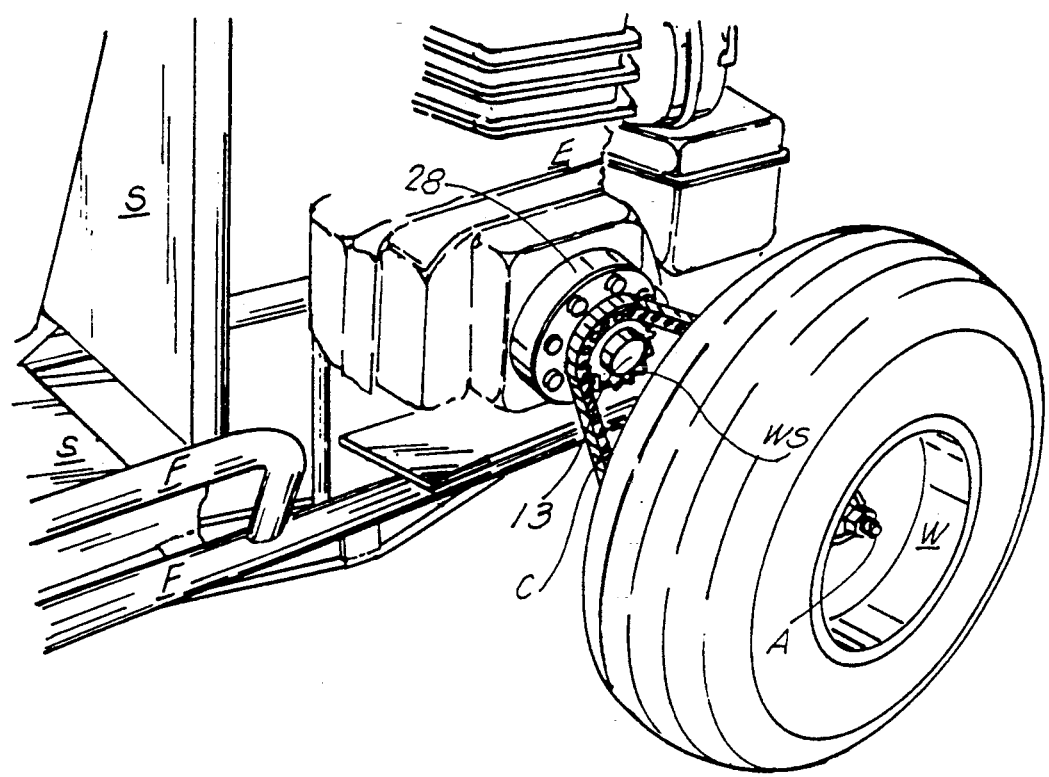
FIG. 1 is an overall view of a motorized cart showing the apparatus of the present invention and including the cart frame, engine, drive chain and rear cart wheels.

FIGS. 1–4A illustrates a typical motorized cart that is engine powered, having a frame, a horizontal engine shaft and rear wheel driven with the chain using a centrifugal clutch. In FIG. 1, cart frame F supports a seating area 5, and a rear mounted engine E. Engine E has a horizontal drive shaft 13 (FIGS. 1, 2, 4) that carries a centrifugal clutch assembly. The centrifugal clutch assembly has an outer clutch housing 28 that has sprocket teeth 30 for driving a chain C connected to a wheel sprocket WS that rotates with rear wheel W and a rear axle A.

Figures 2, 3:
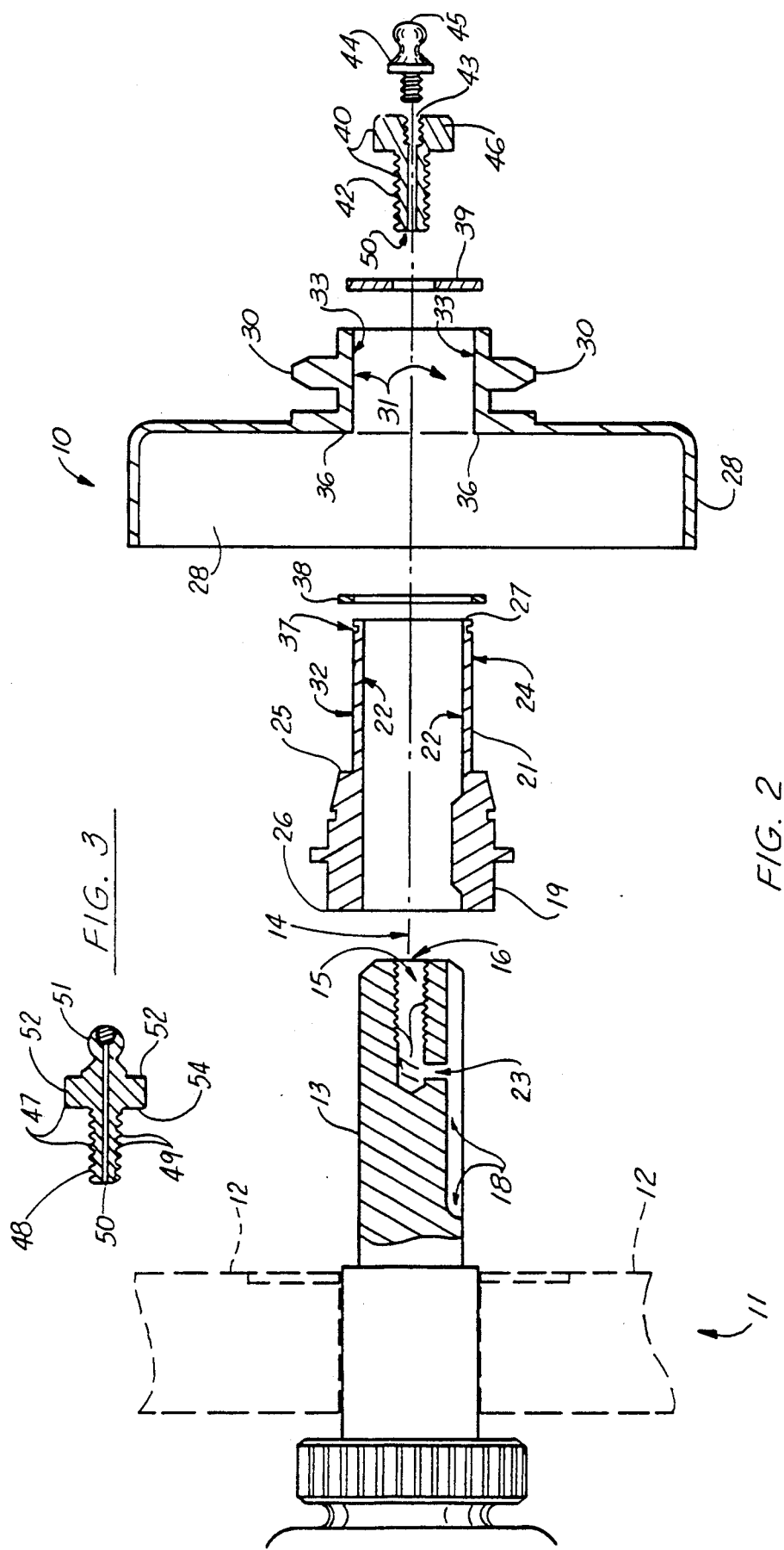
FIG. 2 is an exploded sectional view of the preferred embodiment of the apparatus of the present invention.
FIG. 3 is a fragmentary view of the lubrication inlet portion of the preferred embodiment of the apparatus of the present invention.
Figure 4:
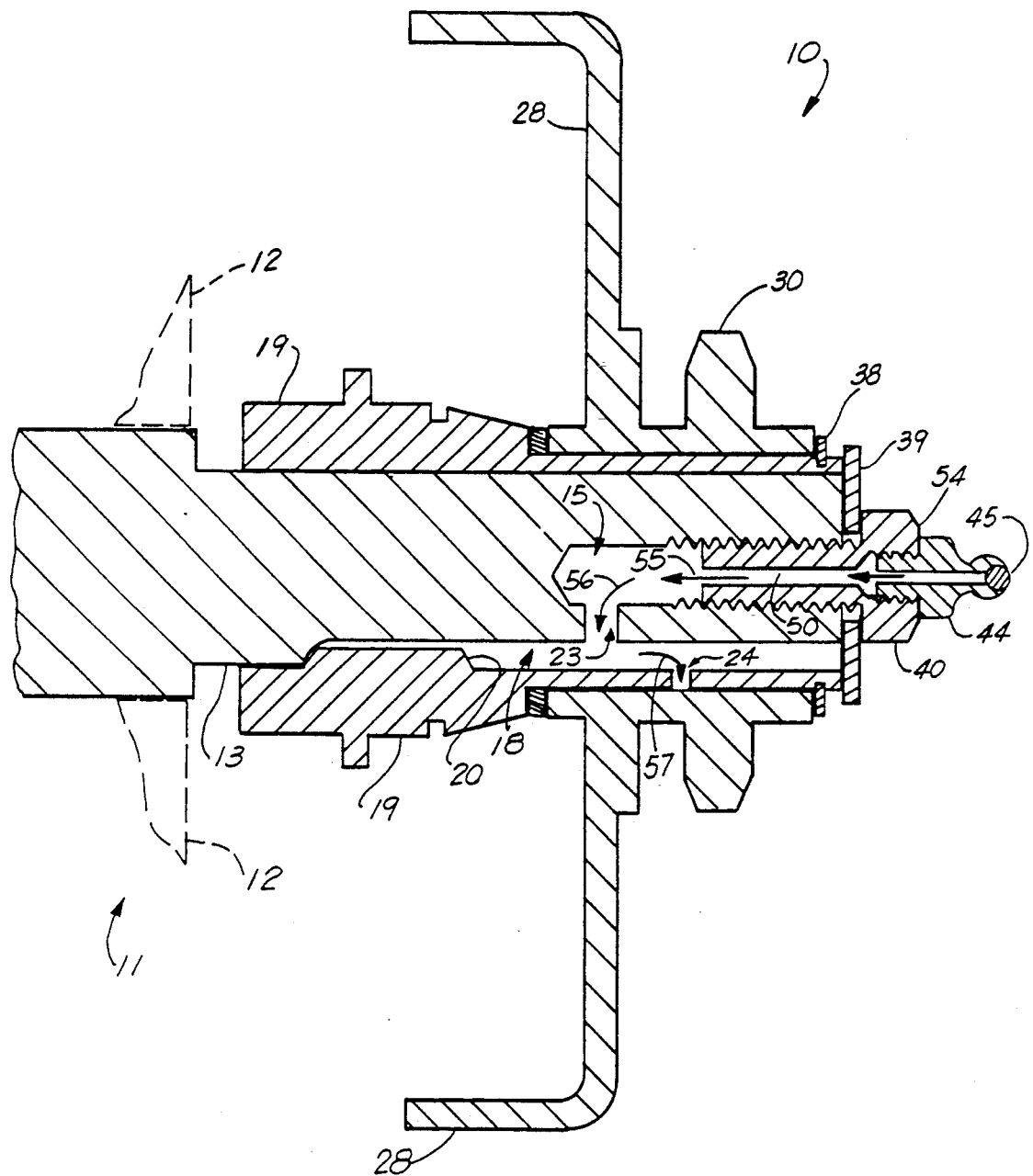
FIGS. 4–4A are sectional elevation views of the preferred embodiment of the apparatus of the present invention.
Figure 4A:
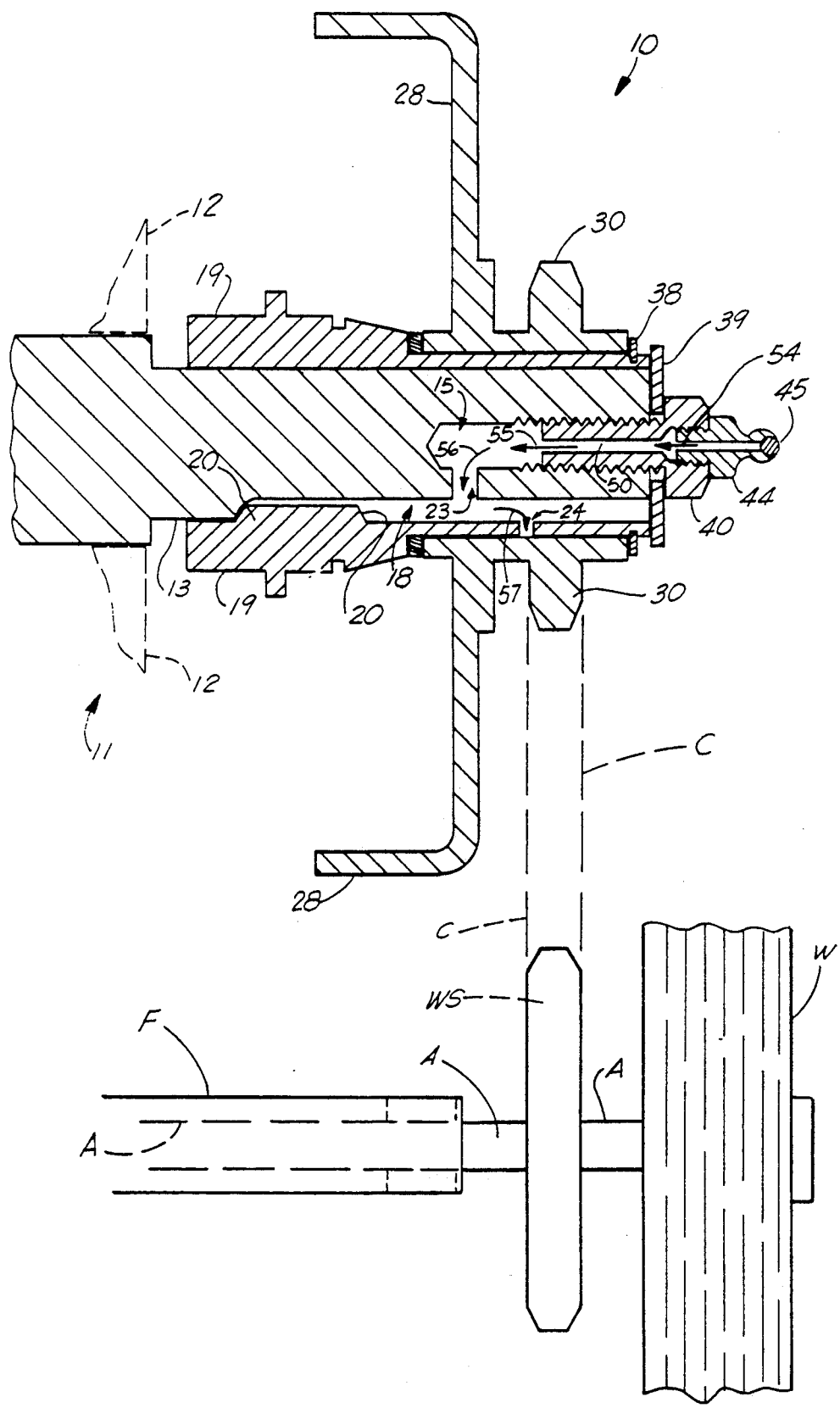

FIGS. 2, 4, and 4A illustrate generally the preferred embodiment of the apparatus of the present invention designated generally by the numeral 10. Cart clutch assembly 10 is used in combination with an internal combustion engine 11 having a housing 12. Such engines are commercially available, being sold and manufactured by Honda, Briggs & Stratton, Kawasaki, Techumse, and others. The engine 11 includes a horizontally extending shaft 13 that is generally horizontally positioned during operation. The engine 11 is bolted, for example, to a metallic frame (not shown) portion of the cart apparatus. Horizontal shaft 13 includes a shaft central axis 14. An end portion of the shaft 13 extends out of the engine 11. Shaft 13 has an internal, threaded, open ended bore 15. The bore 15 is closed at its inner end and open at the end adjacent the tip of shaft 15, the open end being designated as 16 in FIG. 2. The threaded bore 15 provides internal thread 17.

Shaft 13 includes an outer key slot 18 that extends longitudinally along the outer surface of the shaft 13. Clutch bushing 19 affixes to shaft 13 and is affixed thereto in rigid fashion using a key 20 portion of clutch bushing 19 (not shown) which registers in key slot 18. Clutch bushing 19 provides a generally cylindrical body portion 21 and an internal cylindrically-shaped bore 22.

A first radially extending port 23 extends from threaded bore 15 and through horizontal shaft 13. For alignment purposes, port 23 can be formed at key slot 18. Clutch bushing 19 provides a second radial extending port 24 that extends from the inner surface of clutch bushing 19 at bore 22 to the outer cylindrical surface 32 thereof. Clutch bushing 19 includes an annular shoulder 25 that defines an enlarged portion of clutch bushing 19. The clutch bushing 19 has inner 26 and outer 27 end portions.

Clutch housing member 28 rides upon clutch bushing 19 in rotary fashion. When the cart idles, the centrifugal operating portion (not shown) of the clutch is disengaged and clutch bushing 19 freely rotates with respect to clutch housing member 28. When the engine 11 revolutions are increased to a higher rpm, the centrifugal portion of the clutch expands to engage clutch housing member 28 so that the clutch housing member 28 and clutch bushing 19 rotate as a unit. The clutch centrifugal operating portion is commercially available from MAX-TORQUE, LTD. of Melrose Park, Ill. MAX-TORQUE sells a centrifugal clutch that includes a clutch bushing and clutch housing as well as a centrifugal operating portion.

The clutch housing member 28 includes a plurality of radially extending and circumferentially-spaced sprocket teeth 30 for driving a chain. A similar plurality of sprocket teeth would be provided upon the cart axle sprocket (not shown) so that a single endless drive chain or drive belt can engage the sprocket teeth 30 of the clutch housing member 28, and the axle sprocket of the cart (not shown). It should be understood that the overall assembly of engine horizontal drive shaft, centrifugal clutch and its clutch sprocket, axle sprocket, axle, and an endless belt or chain to engage both the clutch sprocket and axle sprocket is well know in the art.

Clutch housing member 28 provides an inner cylindrical surface 33 that defines a cylindrical bore 31 that is sized and shaped to register closely upon outer cylindrical surface 32 of clutch bushing 19 with some clearance therebetween. It is the interface between the outer surface 32 of clutch bushing 19 and the inner surface of clutch housing member 28 bore 31 that becomes filled with abrasives, and prone to destruction because of abrasion and excess heat if not lubricated.

The inner portion of clutch bushing 19 provides an annular shoulder 25 that limits the inward movement of clutch housing member 28. The annular shoulder defines an enlarged end portion 35 of clutch bushing 19. An inner annular surface 36 of clutch housing 28 registers against annular shoulder 25 of enlarged portion 35 upon assembly. Enlarged portion 35 registers against annular shoulder 34 of drive shaft 13 upon assembly. Upon assembly of clutch bushing 19 and clutch housing member 28 upon horizontal shaft 13, a retainer ring 38 registers in annular groove 37 to retain the member 28 upon the bushing 19. Washer 39 and bolt 40 can be used to secure the entire clutch assembly upon the horizontal drive shaft. Bolt 40 has an enlarged head 46 that is hex shaped to accept a wrench.

Bolt 40 provides a central longitudinally extending bore 41. Bolt 40 also provides external threads 42 that engage the internal threads 17 of threaded bore 15 of horizontal shaft 13. Threads 17 terminate before reaching port 23. Bolt 40 is of a length that tracks and engages threads 17, but its length is not so long that it covers or blocks port 23 (see FIG. 4A). Internal threads 43 of bolt 40 are receptive of grease fitting 44. Grease fitting 44 can be a commercially available grease fitting that has an inlet 45 for receiving grease. During use, grease is added to grease fitting 44 via inlet 45 with a conventional grease gun. The grease flows sequentially through the central bore 41 of bolt 40, into threaded bore 15, into radially extending port 22, and then into radially extending port 23. After exiting radially extending port 23, grease flows freely into the interface between the outer cylindrical surface 32 of clutch bushing 19 and the bore of clutch housing member 28, lubricating that interface (see FIG. 4A).

The present invention thus provides a simple straightforward method and apparatus for providing grease from the exterior of the cart, through the engine horizontal drive shaft 13 and to the clutch.

In FIG. 3, an alternate construction for admitting grease into threaded bore 15 is provided in the form of fitting 47. Fitting 47 has an elongated threaded shank 48 that can be sized sufficiently to develop a load for holding the clutch bushing 19 and clutch housing member 28 upon shaft 13, replacing the bolted connection of the prior art that typically secures a centrifugal clutch to a horizontal drive shaft during use. Fitting 47 includes a threaded shank 48, external threads 49, a central longitudinal bore 50, a grease nipple end portion 51, and an enlarged head 52 that can be hexagonally shaped to accept a wrench. Further, an inlet 53 allows grease to be introduced through grease nipple 51 into bore 50. Fitting 47 also provides an outlet for discharging grease to threaded bore 15. Annular shoulder 54 is enlarged to abut washer 39 so that the washer is maintained in position against clutch housing member 28, holding it firmly in operative position upon horizontal shaft 13. Arrows 54-56 in FIG. 4A illustrates the flow of grease from fitting 44 to the interface between surfaces 32, 33.

The following table lists the parts numbers and parts descriptions as used herein and in the drawings attached hereto.

| PARTS LIST | |
|---|---|
| Part Number | Description |
| 10 | lubrication apparatus |
| 11 | engine |
| 12 | housing |
| 13 | horizontal shaft |
| 14 | shaft central axis |
| 15 | threaded bore |
| 16 | open end |
| 17 | threads |
| 18 | key slot |
| 19 | clutch bushing |
| 20 | key |
| 21 | cylindrical body |
| 22 | cylindrical bore |
| 23 | radially extending port |
| 24 | radially extending port |
| 25 | annular shoulder |
| 26 | inner end portion |
| 27 | outer end portion |
| 28 | clutch housing member |
| 29 | annular shoulder |
| 30 | sprocket teeth |
| 31 | cylindrical bore |
| 32 | outer cylindrical surface |
| 33 | inner surface |
| 34 | annular shoulder |
| 35 | enlarged portion |
| 36 | annular surface |
| 37 | retainer ring |
| 38 | annular groove |
| 39 | washer |
| 40 | bolt |
| 41 | bore |
| 42 | threads |
| 43 | internal threads |
| 44 | grease fitting |
| 45 | inlet |
| 46 | enlarged head |
| 47 | fitting |
| 48 | shank |
| 49 | threads |
| 50 | bore |
| 51 | grease nipple |
| 52 | enlarged head |
| 53 | inlet |
| 54 | arrow |
| 55 | arrow |
| 56 | arrow |
| 57 | arrow |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A centrifugal, shaft-driven clutch apparatus comprising:
   a) an engine shaft for providing rotary power, the shaft having a free end portion, an open ended shaft bore that communicates with the free end portion, and a longitudinally extending key slot;
   b) a centrifugal clutch assembly that includes a clutch bushing member having a bushing member bore for affixing the bushing member to the shaft;
   c) the bushing member having an outer surface;
   d) the clutch assembly including a clutch housing member with an internal clutch housing bore, and the clutch housing member rotatably mounts upon the clutch bushing member at the clutch housing internal bore;
   e) the housing having an external surface with a sprocket thereon for driving a chain that is connected to the sprocket;
   f) a first port that extends radially through the engine shaft between the shaft bore and the bushing member bore for transmitting lubricant from the shaft bore to the clutch bushing member and wherein the first port extends through the shaft bore and to the key slot;
   g) a second port that extends through the bushing member from the bushing member bore to the bushing member outer surface for permitting lubricant to flow from the first port through the key slot to the second port;
   h) channel means, forming a communication between the first and second ports, for transmitting lubricant between the first and second ports; and
   i) a fitting that has an inlet for receiving lubricant, the fitting have a channel for transmitting lubricant to the shaft bore.

2. The apparatus of claim 1 wherein the bushing member is generally cylindrically shaped.

3. The apparatus of claim 1 wherein the first port is generally cylindrically shaped.

4. The apparatus of claim 1 wherein the first and second ports are positioned adjacent one another.

5. The apparatus of claim 1 wherein the shaft provides a transverse key slot, and the clutch bushing assembly provides a key portion that registers with the key slot so that the clutch bushing member and engine shaft rotate together during use.

6. The apparatus of claim 1 wherein the engine shaft includes a longitudinally extending key slot, and the first port extends between the shaft bore and the key slot.

7. The apparatus of claim 1 wherein the second port is generally cylindrically shaped.

8. The apparatus of claim 1 wherein the second port extends between the bushing member bore and the outer surface thereof along a radially extending line.

9. The apparatus of claim 1 wherein the channel means comprises a key slot that extends along the outer surface of the engine shaft and communicates with the first and second ports, and there is further provided a key on the clutch bushing member that engages the key slot during use.

10. A centrifugal, shaft-driven clutch apparatus for operating a small powered, wheeled cart comprising:
   a) a horizontally extending engine shaft for providing rotary power, the shaft having a free end portion and an open ended bore that communicates with the free end portion;
   b) a centrifugal clutch assembly that includes a clutch bushing member having a shaft bore for affixing the bushing member to the engine shaft at the shaft bore;
   c) the bushing member having a generally cylindrical outer surface portion;

d) the clutch assembly including a clutch housing member that can rotate with respect to the bushing member, having a housing internal bore, and the clutch housing member rotatably mounts upon the clutch bushing member at the housing internal bore;

e) the housing having an external surface with a sprocket thereon for driving a sprocket that is connected to the sprocket;

f) lubrication channel means for transmitting a source of lubricant to the outer cylindrical surface of the clutch bushing member;

g) an inlet fitting that has an inlet for receiving lubricant from a source of lubricating medium, the fitting having a bore for transmitting lubricant between the source and the channel means.

11. The apparatus of claim 10 wherein the bushing member is generally cylindrically shaped.

12. The apparatus of claim 10 wherein the first port is generally cylindrically shaped.

13. The apparatus of claim 10 wherein the shaft provides a transverse key slot, and the clutch bushing assembly provides a key portion that registers with the key slot so that the clutch bushing member and engine shaft rotate together during use.

* * * * *